United States Patent [19]

Nagano

[11] Patent Number: 4,864,885
[45] Date of Patent: Sep. 12, 1989

[54] SPEED CONTROL DEVICE FOR A BICYCLE

[75] Inventor: Masashi Nagano, Izumi, Japan

[73] Assignee: Shimano Industrial Company Limited, Osaka, Japan

[21] Appl. No.: 168,390

[22] Filed: Mar. 15, 1988

[30] Foreign Application Priority Data

Mar. 20, 1987 [JP] Japan .................................. 62-67625

[51] Int. Cl.$^4$ .............................................. F16C 1/10
[52] U.S. Cl. .................... 74/502.2; 74/489; 74/523; 74/475; 74/142
[58] Field of Search ................... 74/523, 501.6, 502.2, 74/527, 535, 489, 475, 142, 177, 568 T

[56] References Cited

U.S. PATENT DOCUMENTS

| | | | |
|---|---|---|---|
| 2,785,586 | 3/1957 | Schwerdhofer | 74/489 |
| 3,104,559 | 9/1963 | Dotter | |
| 3,972,247 | 8/1976 | Armstrong | 74/502.2 |
| 4,532,825 | 8/1985 | Nagano | 74/502.2 |
| 4,598,607 | 7/1986 | Monie | 74/568 |

FOREIGN PATENT DOCUMENTS

| | | | |
|---|---|---|---|
| 1782593 | 10/1953 | Fed. Rep. of Germany . | |
| 468585 | 10/1915 | France . | |
| 59-43191 | 12/1984 | Japan . | |
| 222942 | 11/1942 | Switzerland | 74/489 |
| 248670 | 5/1947 | Switzerland . | |
| 2012893 | 8/1979 | United Kingdom | 74/142 |

Primary Examiner—Gary L. Smith
Assistant Examiner—F. Saether
Attorney, Agent, or Firm—Stevens, Davis, Miller & Mosher

[57] ABSTRACT

A speed control device is provided for operating a bicycle derailleur via a control wire. The device includes a fixing member, an operating member supported rotatably relative to the fixing member and including a plurality of engaging portions and a passive portion, and an operating lever supported rotatably relative to the fixing member and including a transmitting portion engageable with the passive portion of the operating member to transmit an operating force supplied to the operating lever to the operating member. The operating member has one end of the control wire secured thereto. A lever spring biases the operating lever in a predetermined rotation direction, and a retaining pawl is pivoted to the fixing member and is selectively engageable with the engaging portions of the operating member. A pawl spring biases the retaining pawl in a direction of engagement with the engaging portions. A pawl control means controls the retaining pawl to selectively engage and disengage from the respective engaging portions.

3 Claims, 3 Drawing Sheets

SPEED CONTROL DEVICE FOR A BICYCLE

FIELD OF THE INVENTION

The present invention relates to a speed control device for a bicycle, and more particularly to a speed control device for a bicycle which turns an operating lever in reciprocation in one direction to thereby change the bicycle speed.

BACKGROUND OF THE INVENTION

This conventional kind of device, as disclosed in Japanese Utility Model Laid-Open Gazette No. Sho 57-17,893, has (1) first and second operating levers pivotally supported to a fixing member through a lever shaft, (2) one end of a control wire fixed to the first operating lever, and (3) retaining mechanism between the fixing member and each operating lever, which positions and holds one operating lever at the operating position of each operating lever and alternately releases each operating lever from being held.

In the conventional speed control device, when a bicycle derailleur is at, for example, the top position, in order to change the speed to the low position, the first operating lever is turned in the direction of pulling the control wire, whereby the retaining mechanism holding the second operating lever at the top position is released so that the second operating lever returns to the original position by a return spring, and the first operating lever is held at the low position by the retaining mechanism.

The second operating lever at the original position is turned in the same direction as the first operating lever, thereby changing the speed from the low position again to the top position. Hence, the retaining mechanism holding the first operating lever at the low position is released so that the first operating lever is restored by a return spring to the original position and the second operating lever is held at the top position.

Such conventional speed control device, which uses two levers pivoted to the fixing member, is complicated in construction and expensive to produce. Also, since each operating lever is alternately operated, each operating lever, when operated for changing the speed, must be operated by the cyclist changing the position of his finger. As a result, it is troublesome for him to search for the position of the operating lever upon each operation.

SUMMARY OF THE INVENTION

An object of the invention is to provide a speed control device which uses one operating lever and turns it in one direction for changing the bicycle speed. Accordingly, the operating lever, even when operated to any speed change stage, can always be restored to a predetermined position and operated in the same range from the same position regardless of the number of speed change stages.

The speed control device of the invention is so constructed that a fixing member rotatably supports (1) an operating member which has a plurality of engaging portions and a passive portion and retains one end of a control wire and (2) an operating lever which has a transmitting portion engageable with the passive portion to transmit an operating force to the operating member to cause it to move following the operating lever. The operating lever is biased by a lever spring in one direction of rotation and the fixing member pivotally supports a retaining pawl engageable with one engaging portion and biased by a pawl spring in the engaging direction. The operating lever is provided with a pawl control means for controlling the retaining pawl to disengage from the engaging portion.

When the operating lever is turned in one direction, an operating force of the lever is transmitted to the operating member from the transmitting portion through the passive portion, with the operating member rotating following the operating lever at a predetermined angle to pull the control wire, thus enabling the bicycle derailleur to be operated to a predetermined speed change stage at, for example, the low side. At this time, since the retaining pawl engages with the next adjacent engaging portion, the operating member is impeded from being restored to its predetermined position thereby maintaining a desired speed change stage. On the other hand, the operating lever, when released, is restored by a lever spring until the predetermined position and stands by until the next operation. The control means is actuated to disengage the retaining pawl from the engaging portion, the operating member being restored to the predetermined position by, for example, a return spring at the derailleur, thereby changing the bicycle speed to the predetermined speed change stage at, for example, the top side.

Accordingly, the present invention is simple in construction and inexpensive to produce in comparison with the conventional example which has the two operating levers. Moreover, one operating lever is operated to enable a speed change, to be affected and after changing the speed, the operating lever can always be restored to the predetermined position, whereby the operating lever can simply be operated without searching for the position thereof for changing the bicycle speed. Moreover, the operating lever need only be operated in a predetermined range regardless of the number of speed change stages, thereby great facilitating speed control.

The above and further objects and novel features of the invention will be more fully apparent from the following detailed description when the same is read in connection with the accompanying drawings.

DETAILED DESCRIPTION OF THE INVENTION

Figure 1:
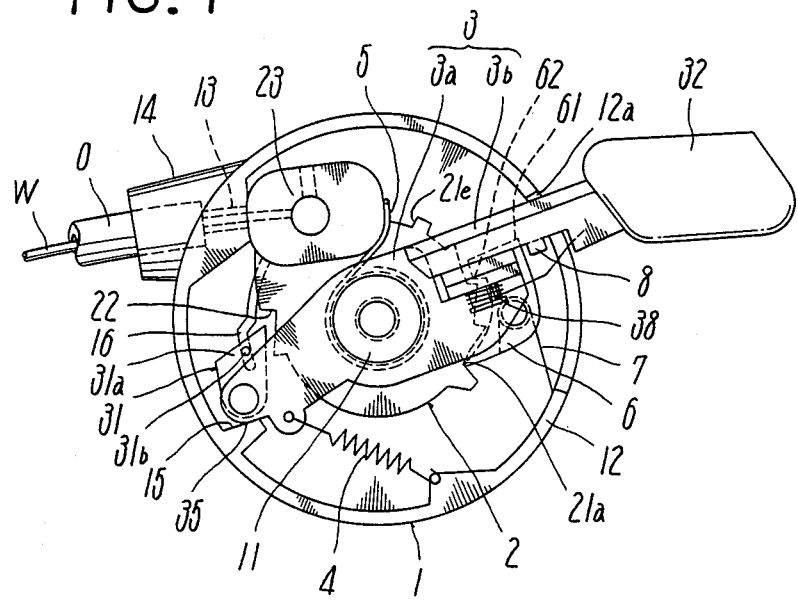
FIG. 1 is a partial plan view of an embodiment of a speed control device of the invention.
Figure 2:
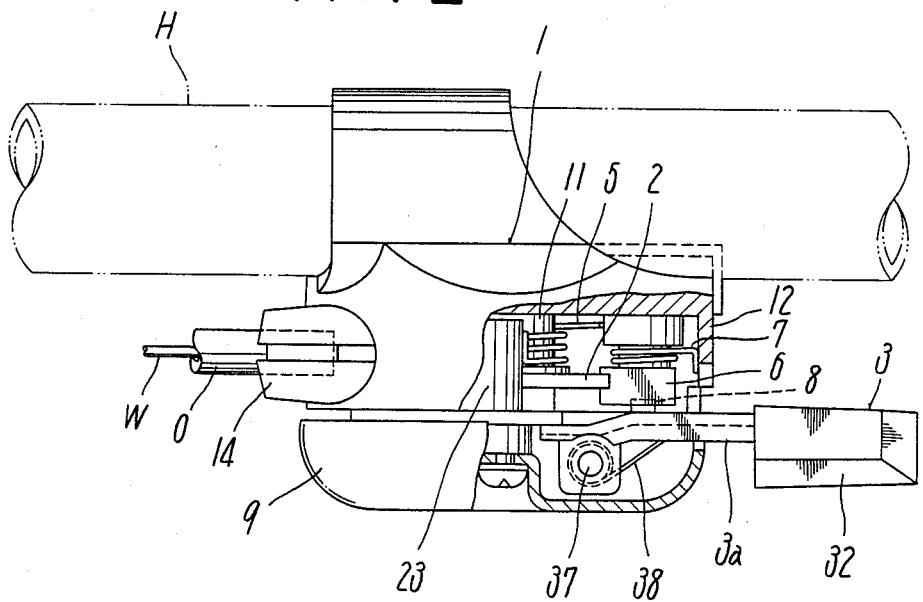
FIG. 2 is a partial cutaway rear view of the FIG. 1 embodiment.

An embodiment of a speed control device of the invention shown in the drawings includes an operating member 2 having at its outer periphery a plurality of engaging portions 21a to 21e and one passive portion 22 and retaining a control wire W at one end thereof, and an operating lever 3 having and operating portion 32 and a transmitting portion 31 engageable with passive portion 22 for allowing the operating member 2 to follow the operating lever 3 are operating member 2 and operating lever 3 supported rotatably to a support shaft 11 at a fixing member 1 fixed to a handle H of the bicycle, operating lever 3 is biased by a lever spring 4 in one direction of rotation (counterclockwise in FIG. 1), and operating member 2 is biased by a return spring 5 in one direction of rotation (counterclockwise in FIG. 1). Fixing member 1 pivotally supports a retaining pawl 6 engageable with one engaging portion 21a–e with retaining pawl 6 being biased by a pawl spring 7 in the engaging direction, and the operating lever 3 is supported to the support shaft 11. The operating lever 3 comprises a lever base 3a having the transmitting portion 31 and a lever body 3b separate from the lever base 3a and having the operating portion 32, lever body 3b is rotatably connected to the lever base 3a through a horizontal shaft 37 and is provided with a control 8 which engages with the retaining pawl 6 when the lever body 3b is turned with respect to the lever base 3a and disengages the pawl 6 from an engaging portion 21a–e.

In the above described construction, the fixing member 1 has a round base from which the support shaft 11 is erected and is provided at the outer periphery of the base with a rising wall 12 so that fixing member 1 is substantially box shaped. Rising wall 12 is provided at one circumferential side thereof with a cutout 12a for guiding the operating lever 3 and at its other circumferential side with an insertion bore 13 for the control wire W, a holder 14 for an outer sheath O guiding the wire W, and a stopper 15 to abut against one end of the operating lever 3 to establish a forward movement start postion. The return spring 5 is wound around the support shaft 11 and engages at one end with the fixing member 1 and at its other end with operating member 2.

The operating member 2 is substantially disc-shaped and is provided at one side of the outer periphery with its engaging portions 21a to 21e disposed circumferentially of the operating member 2 and spaced at predetermined intervals, and at its other side with the passive portion 22 and a wire retainer 23.

The lever base 3a and lever body 3b are formed of bent metal plates respectively. Lever base 3a is elongated and includes (1) its substantially lengthwise center portion a shaft bore 33 fitted onto the support shaft 11, (2) at one lengthwise end a connector 34 projecting therefrom, and (3) at its other lengthwise end a transmitting pawl 31a of the transmitting member 31 and a contact portion 35 to abut against the stopper 15. Lever spring 4 is interposed between the end of the lever base 3a at the transmitting member side and the fixing member 1. Lever spring 4, causes contact portion 35 to abut against the stopper 15, thereby keeping the operating lever 3 always in a predetermined position. The transmitting pawl 31a has a pin 31b projecting therefrom, and fixing member 1 includes a guide groove 16 engageable with the pin 31b to guide the transmitting pawl 31a to the passive portion 22.

At one end of lever body 3b is erected a connecting member 36 positioned opposite to the connecting member 34 connecting members 34 and 36 are swingably connected through a horizontal connecting shaft 37 perpendicular to the support shaft 11. A return spring 38 is wound around the connecting shaft 37 and engages at one end with the lever base 3a and at its other end with the lever body 3b, the lever base 3a and lever body 3b being normally kept linear. Control 8 projects from the lever body 3b integrally therewith.

The retaining pawl 6 is pivoted at an intermediate portion thereof to the fixing memebr 1 and freely engages or disengages at its tip portion with and engaging portion 21a–e. Pawl 6 is provided at its base with a contact portion 61 to abut against the control 8 and a limit portion 62 for limiting the backward movement of the operating member 2 caused by the return spring 5 when the tip of retaining pawl 6 disengages from the engaging portion 21.

In addition, in the drawings, reference numeral 9 designates a dome covering the operating member 2 and operating lever 3 so that a trigger (not shown) pivoted to the fixing member 1 is operated to ring a bell.

Figure 3:
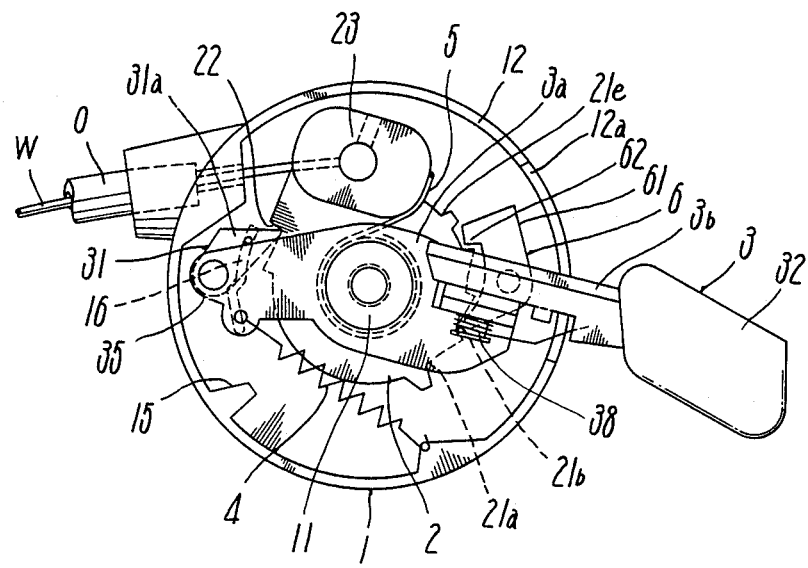
FIGS. 3 to 5 are illustrations of operating condition of the FIG. 1 embodiment.

The speed control device constructed as described is used preferably with a three-stage speed change derailleur incorporating a speed change mechanism in a hub shell. Referring to FIG. 1, the speed control device at the high speed stage is shown. When the operating lever 3 stopped initially at the forward movement start position by the lever spring 4 is turned forwardly (clockwise) from the condition shown in FIG. 1, the transmitting portion 31 engages with the passive portion 22 to transmit an operating force of operating lever 3 to the operating member 2, so that the operating member 2 rotates clockwise to pull the control wire W. The operating member 2 rotates to shift a first engaging portion 21a from the tip of retaining pawl 6 engaging therewith and then the operating lever 3 turns clockwise by a predetermined stroke over one pitch of engaging portion 21 so as to change the speed to the medium speed stage. In this condition, pawl 6, as shown in FIG. 3, engages at its tip with an adjacent second engaging portion 21b, thereby impeding the operating member 2 from moving backwardly and reliably keeping the speed change stage at the medium speed stage. At this time, the operating lever 3, when released, turns backwardly (counterclockwise in FIG. 3) due to lever spring 4 and contact portion 35 abuts against stopper 15 so as to and stop at return to the original position until stand by to the next operation.

Figure 4:
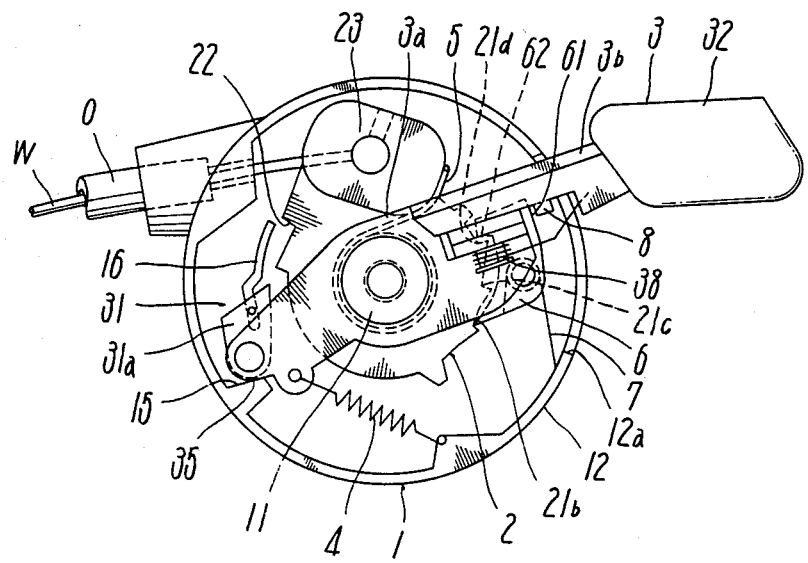

When the operating lever 3 at the starting position is newly turned forwardly (clockwise in FIG. 4), the operating member 2, the same as described above, rotates following the lever 3 so as to pull further the control wire W to change the speed to the low speed stage, at which time the retaining pawl 6 engages at its tip with a third engaging portion 21c to impede the operating member 2 from moving backwardly (counterclockwise). On the other hand, the lever 3, when released, is restored backwardly (counterclockwise) to the starting position to stop thereat.

Figure 5:
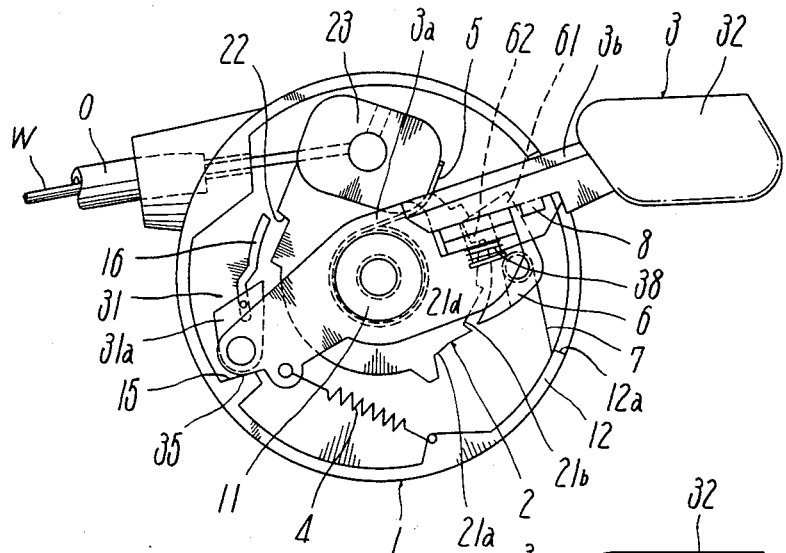
Figure 6:
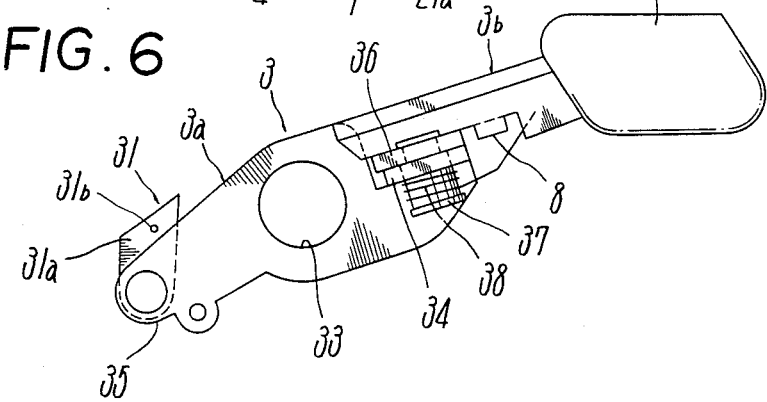
FIG. 6 is a plan view of an operating lever only.
Figure 7:
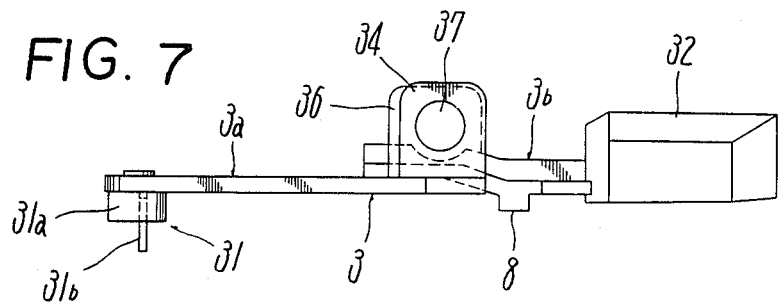
FIG. 7 is a front view thereof.

Next, when the bicycle speed is changed from the medium speed stage in FIG. 4 again to the high speed stage, the operating portion 32 at the lever body 3b of operating lever 3 positioned at the forward movement start position is pushed in the same direction as the axis of rotation of the lever 3, whereby the lever body 3b rotates around the connecting shaft 37 with respect to the lever base 3a. Hence, the control 8 at the lever body 3b abuts against the contact portion 61 of retaining pawl 6, thereby rotating the retaining pawl 6 counterclockwise in FIG. 4. As a result, the tip of retaining pawl 6 disengages from the second engaging portion 21b and the operating member 2 rotates backwardly (counterclockwise) by the return spring 5 so that the second engaging portion 21b shifts out of engagement with the pawl 6, at which time, as shown in FIG. 5, a fourth engaging portion 21d abuts against the limit portion 62 to thereby impede the operating member 2 from backward movement and generate sounds by contact of engaging portion 21d with the limit portion 62. Hence, a cyclist hears the sounds to be informed of the speed change operation.

The lever body 3b, when released, is restored by the return spring 38, so that the retaining pawl 6 disengages from the control 8 and returns toward the first engaging portion 21a by the pawl spring 7. Hence, the operating member 2 is released from restriction of the limit portion 62 so as to be rotated backwardly (counterclockwise) by the return spring 5 to loosen the control wire, thereby changing the speed to the high speed stage. Also, the operating member 2 is impeded from rotation by engagement of the retaining pawl 6 with the first engaging portion 21a, thereby enabling the speed control device to be maintained at the high speed stage.

Also, even when the lever body 3b is pushed in the condition where the retaining pawl 6 engages with the third engaging portion 21c to change the speed to the low speed stage, the operating member 2 is restored to change the speed to the medium speed stage described same as the above.

Alternatively, a return spring in the derailleur may be utilized to restore the operating member 2. Accordingly, return spring 5 between the operating member 2 and the fixing member 1 is not indispensable.

Alternatively, the operating lever 3 may instead of being divided be formed integrally in one piece and have play with respect to the support shaft 11, thereby being axially inclined. Also, the operating lever 3 may support a control pin, or a control lever, biased backwardly by a spring so that the control pin or control lever may be actuated to rotate the retaining pawl 6 in the disengaging direction, the construction thereof being not particularly limited.

Alternatively, the transmitting pawl 31a may be, so that the transmitting portion is not particularly limited in construction.

Alternatively, the speed control device of the invention may be used for any number of speed change, stages (e.g., two, three, four or more) and also may be used together with an outer derailleur.

While an embodiment of the invention has been shown and described, the invention is not limited to the specific construction thereof, which is merely exemplary in the specification rather than defined.

What is claimed is:

1. A speed control device for a bicycle, for operating a derailleur by a control wire, said device comprising:
   a fixing member,
   an operating member supported rotatably relative to said fixing member and including a plurality of engaging portions and a passive portion, said operating member being adapted to retain one end of said control wire,
   an operating lever supported rotatably relative to said fixing member and including a transmitting portion engageable with said passive portion to transmit an operating force applied to said operating lever to said operating member,
   a lever spring means for biasing said operating lever in one direction of rotation,
   a retaining pawl pivoted to said fixing member and selectively engageable with said engaging portions of said operating member,
   a pawl spring means for biasing said retaining pawl in a direction of engaging with said engaging portions, and
   a pawl control means for controlling said retaining pawl to selectively engage with and disengage from said engaging portions,
   wherein said retaining pawl has (i) a foremost pawl portion selectively engageable with each of said engaging portions of said operating member and (ii) a contact portion, said pawl control means including a control portion which contacts with said contact portion of said retaining pawl to selectively disengage said retaining pawl from said engaging portions, and
   wherein said operating lever includes a lever base supported rotatably to said fixing member and a lever body swingably supported to said lever base to be swingable around an axis substantially perpendicular to an axis of rotation of said lever base relative to said fixing member, said lever body being provided with said control portion.

2. A speed control device for a bicycle according to claim 1, wherein a return spring is interposed between said operating member and said fixing member for biasing said operating member in one direction of rotation thereof.

3. A speed control device for a bicycle according to claim 1, wherein said transmitting portion comprises a transmitting pawl and said fixing member includes a guide groove in which said transmitting pawl is engaged so as to be guided to engage with said passive portion.

* * * * *